United States Patent
Passaniti et al.

(10) Patent No.: US 11,989,065 B2
(45) Date of Patent: May 21, 2024

(54) SCREEN STATE DETECTION USING AN ELECTROSTATIC CHARGE VARIATION SENSOR

(71) Applicant: STMICROELECTRONICS S.r.l., Agrate Brianza (IT)

(72) Inventors: Fabio Passaniti, Syracuse (IT); Enrico Rosario Alessi, Catania (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 307 days.

(21) Appl. No.: 17/578,336

(22) Filed: Jan. 18, 2022

(65) Prior Publication Data
US 2023/0229201 A1 Jul. 20, 2023

(51) Int. Cl.
*H01T 23/00* (2006.01)
*G06F 1/16* (2006.01)

(52) U.S. Cl.
CPC .......... *G06F 1/1677* (2013.01); *G06F 1/1616* (2013.01); *G06F 1/1652* (2013.01)

(58) Field of Classification Search
None
See application file for complete search history.

(56) References Cited

U.S. PATENT DOCUMENTS

| | | | |
|---|---|---|---|
| 7,868,778 B2 * | 1/2011 | Kenwright | G08B 21/00 340/815.4 |
| 8,633,910 B2 | 1/2014 | Miyazawa et al. | |
| 9,524,030 B2 | 12/2016 | Modarres et al. | |
| 11,778,358 B2 * | 10/2023 | Alessi | G01R 29/12 381/380 |
| 2009/0086879 A1 | 4/2009 | Ogata et al. | |
| 2011/0304564 A1 | 12/2011 | Kim et al. | |
| 2012/0278638 A1 | 11/2012 | Wang et al. | |
| 2012/0315847 A1 | 12/2012 | Li et al. | |
| 2014/0232516 A1 | 8/2014 | Stivoric et al. | |
| 2015/0378557 A1 | 12/2015 | Jeong et al. | |
| 2016/0299530 A1 * | 10/2016 | Zhang | G06F 1/1652 |
| 2016/0342781 A1 | 11/2016 | Jeon | |
| 2017/0017271 A1 * | 1/2017 | Song | G06F 1/1652 |
| 2018/0038948 A1 | 2/2018 | Kemppinen | |
| 2019/0064950 A1 | 2/2019 | Hsu | |
| 2019/0259351 A1 | 8/2019 | Yoon et al. | |
| 2020/0033992 A1 | 1/2020 | Kitada | |
| 2020/0209922 A1 * | 7/2020 | Lu | G01B 7/16 |
| 2020/0400426 A1 | 12/2020 | Gallardo | |

(Continued)

FOREIGN PATENT DOCUMENTS

| | | |
|---|---|---|
| EP | 2980609 A1 | 2/2016 |
| KR | 20080095447 A | 10/2008 |
| KR | 20110061750 A | 6/2011 |

OTHER PUBLICATIONS

Wang, "Capacitive Sensing: Ins and Outs of Active Shielding," Texas Instruments, Application Report SNOA926A, Feb. 2015, 13 pages.

*Primary Examiner* — Stephen W Jackson
(74) *Attorney, Agent, or Firm* — Seed IP Law Group LLP (57) ABSTRACT

The present disclosure is directed to devices and methods for performing screen state detection. The screen state detection may be used in conjunction with any device with a bendable display. The device and method utilizes an electrostatic charge variation sensor to detect whether the display is in an open state or a closed state.

20 Claims, 7 Drawing Sheets

(56) References Cited

U.S. PATENT DOCUMENTS

| | | |
|---|---|---|
| 2021/0011520 A1 | 1/2021 | Bhat et al. |
| 2021/0012687 A1 | 1/2021 | Li et al. |
| 2023/0125175 A1 | 4/2023 | Rivolta et al. |

* cited by examiner

SCREEN STATE DETECTION USING AN ELECTROSTATIC CHARGE VARIATION SENSOR

BACKGROUND

Technical Field

The present disclosure is directed to screen state detection for electronic devices.

Description of the Related Art

Display technology has significantly improved. Today, displays, such as organic light-emitting diode (OLED) displays, are bendable and may be folded or rolled onto itself. Many portable electronic device have incorporated these displays to create foldable or rollable devices. For example, many smartphones and tablets include foldable displays to open and close similar to a book.

Foldable and rollable devices typically include screen state detection in order to detect whether the device is open with the display being unfolded or unrolled, or closed with the display being folded or rolled. The device may, for example, turn the display on or off depending on whether the device is open or closed.

Various techniques may be used to perform screen state detection. For example, capacitive sensing, switch mechanisms, and magnetic and optical solutions are common techniques to perform screen state detection. These solutions, however, involve complex algorithms, have high power consumptions, and often suffer from noise in a surrounding environment.

BRIEF SUMMARY

The present disclosure is directed to a device and method for performing screen state detection for a bendable display. The screen state detection may be used in conjunction with, for example, foldable and rollable display devices. The device includes a stimulus electrode that transmits a key signal, a receiving electrode that detects electrostatic charge variation, and an electrostatic charge variation sensor that measures the variation of electrostatic charge received by the receiving electrode. The device decodes the sequence of the measured electrostatic charge variation to determine whether the key signal has been received by the receiving electrode. The device determines the bendable display is in a closed state (e.g., folded or rolled) when the key signal has been received by the receiving electrode.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing electronic components, sensors, and bendable screens have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, various techniques, such as capacitive sensing, switch mechanisms, and magnetic and optical solutions, may be used to perform screen state detection for devices with bendable displays. These solutions, however, involve complex algorithms, have high power consumptions, and often suffer from noise in a surrounding environment.

The present disclosure is directed to a device and method that performs screen state detection for a bendable display. The device and method utilizes an electrostatic charge variation sensor to detect whether the display is in an open state or a closed state. The electrostatic charge variation sensor provides a low cost and low power solution for screen state detection.

Figure 1:
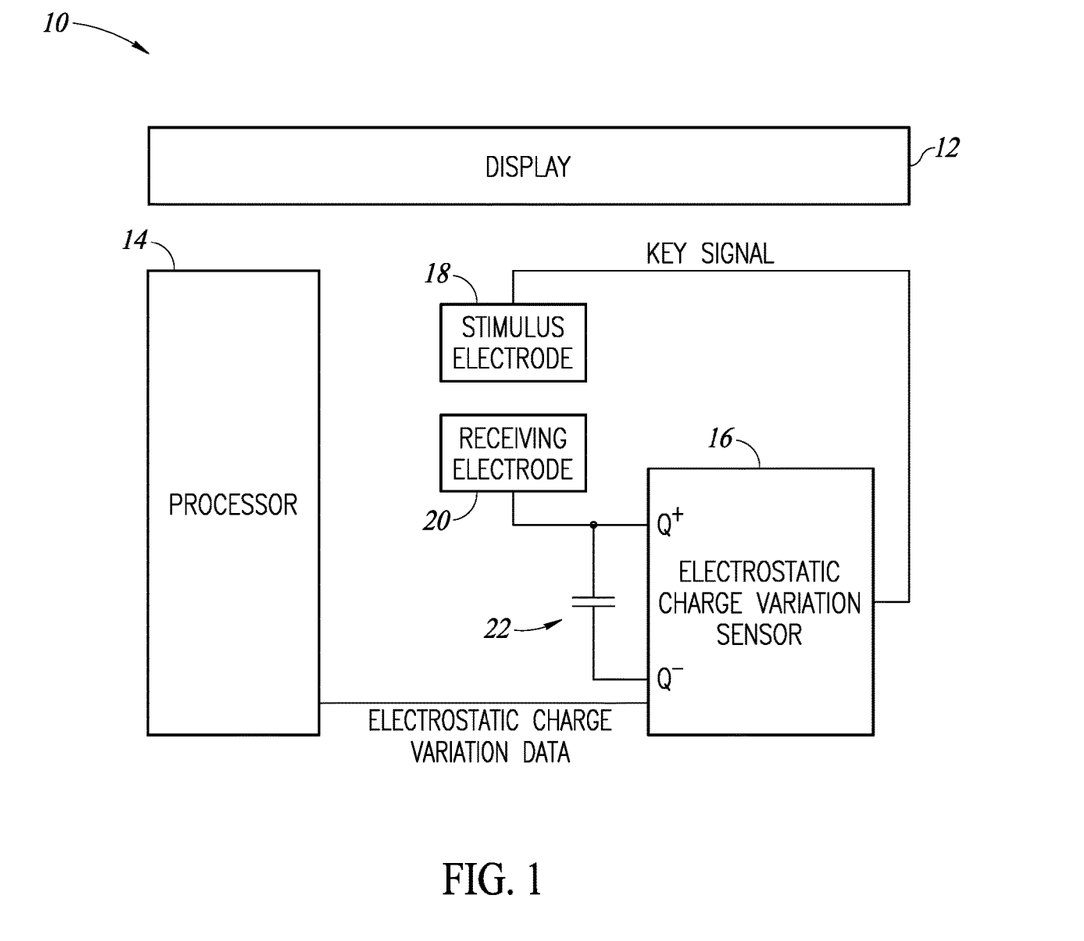
FIG. 1 is a block diagram of a device according to an embodiment disclosed herein.

FIG. 1 is a block diagram of a device 10 according to an embodiment disclosed herein. The device 10 may be any type of electronic device with a bendable display, such as a foldable or rollable mobile device, electronic reader, cellular phone, and tablet. The device includes a display 12, a processor 14, an electrostatic charge variation sensor 16, a stimulus electrode 18, and a receiving electrode 20. In one embodiment, the device 10 includes an equal number of stimulus and receiving electrodes.

The display 12 is a bendable display that may be bent (e.g., folded or rolled) on to itself. When the display 12 is in an open state, the display 12 is unbent (e.g., unfolded or unrolled). When the display 12 is in a closed state, the display 12 is bent (e.g., folded or rolled) on to itself. The display 12 may be any type of flexible display, such as a light-emitting diode (LED) display, an organic light-emitting diode (OLED) display, and an electronic ink display.

The processor 14 is electrically coupled to the electrostatic charge variation sensor 16. The processor 14 receives electrostatic charge variation data from the electrostatic charge variation sensor 16. The electrostatic charge variation data indicates measurements by the electrostatic charge variation sensor 16. As will be discussed in further detail below, the processor 14 decodes and validates the electrostatic charge variation data in order to determine whether the display 12 is in an open state or a closed state. The processor 14 may be any type of processor, controller, or microcontroller that is able to process data.

The electrostatic charge variation sensor 16 is electrically coupled to the processor 14, the stimulus electrode 18, and the receiving electrode 20. In one embodiment, the electrostatic charge variation sensor 16 is embedded in a multi-sensor device that includes a plurality of different sensors (e.g., motion sensors, optical sensor, pressure sensors, etc.). The electrostatic charge variation sensor 16 measures variation of electrostatic charge (i.e., a change in electrostatic charge) on the receiving electrode 20. Measurement is made in a passive mode by a high impedance stage of the electrostatic charge variation sensor 16, without internal source of electric charges variation. The electrostatic charge variation sensor 16 provides the measured electrostatic charge variation as electrostatic charge variation data to the processor 14.

The electrostatic charge variation sensor 16 includes a first input $Q^+$ (a positive terminal) and a second input $Q^-$ (a negative terminal). The electrostatic charge variation sensor 16 measures electrostatic charge variation on the receiving electrode 20 via the first input $Q^+$ and the second input $Q^-$. For example, the electrostatic charge variation sensor 16 measures electrostatic charge variation as a differential between signals received by the first input $Q^+$ and the second input $Q^-$. It is noted that an electrostatic charge variation measurement may not be based on a single data point. Rather, the electrostatic charge variation sensor 16 may have a sampling rate, for example, in the range of 200 hertz to 800 hertz, and determine an electrostatic charge variation measurement based on multiple measurements. In one embodiment, a capacitor 22 is electrically coupled between the first input $Q^+$ and the second input $Q^-$. The capacitor 22 receives and stores the electrostatic charge received by the receiving electrode 20. In this embodiment, the electrostatic charge variation sensor 16 measures electrostatic charge stored in the capacitor 22.

The electrostatic charge variation sensor 16 includes various electronic components (e.g., capacitors, resistors, amplifiers, etc.) to measure electrostatic charge variation. The electrostatic charge variation sensor 16, for example, includes an analog-to-digital converter to convert the measured electrostatic charge variation signal to a digital value, and output electrostatic charge variation data as a digital value.

The electrostatic charge variation sensor 16 also generates and transmits a key signal to the stimulus electrode 18. As will be discussed in further detail below, the key signal is a signal that is encoded with a key. The processor 14 determines the display 12 is in a closed state upon determining the key signal has been received by the receiving electrode 20.

The stimulus electrode 18 is electrically coupled to the electrostatic charge variation sensor 16. The stimulus electrode 18 is made of a conductive material, such as copper. The stimulus electrode 18 receives a key signal from the electrostatic charge variation sensor 16, and transmits the key signal. The stimulus electrode 18 transmits the key signal repeatedly (e.g., every 300 to 400 milliseconds). In one embodiment, the stimulus electrode 18 does not transmit the key signal (e.g., idles) between consecutive transmissions of the key signal. For example, the stimulus electrode 18 pauses transmission after every transmission of the key signal for 100 to 200 milliseconds.

The geometry of the stimulus electrode 18 determines the directivity of the electrode. In one embodiment, the stimulus electrode 18 is square or rectangular in shape.

The receiving electrode 20 is electrically coupled to the electrostatic charge variation sensor 16. Namely, the receiving electrode 20 is electrically coupled to the first input $Q^+$ and the second input $Q^-$ of the electrostatic charge variation sensor 16 via the capacitor 22. The receiving electrode 20 is made of a conductive material, such as copper. The receiving electrode 20 receives an electrostatic charge variation in a surrounding environment. The electrostatic charge variation may be generated from a wide variety of sources, such as motion by a person, a presence of an alternating current (AC) power line, and the key signal being transmitted by the stimulus electrode 18.

When the receiving electrode 20 is in proximity to the stimulus electrode 18 (e.g., within 1 to 15 millimeters of the stimulus electrode 18), the receiving electrode 20 receives the key signal transmitted by the stimulus electrode 18. As will be discussed in further detail below, the receiving electrode 20 receiving the key signal indicates that the display 12 is in a closed state.

The geometry of the receiving electrode 20 determines the sensitivity of the electrode. In one embodiment, the receiving electrode 20 is square or rectangular in shape.

As will be discussed in further detail below, the stimulus electrode 18 and the receiving electrode 20 are positioned within a casing of the device 10 and directly underlie the display 12.

Figure 2:
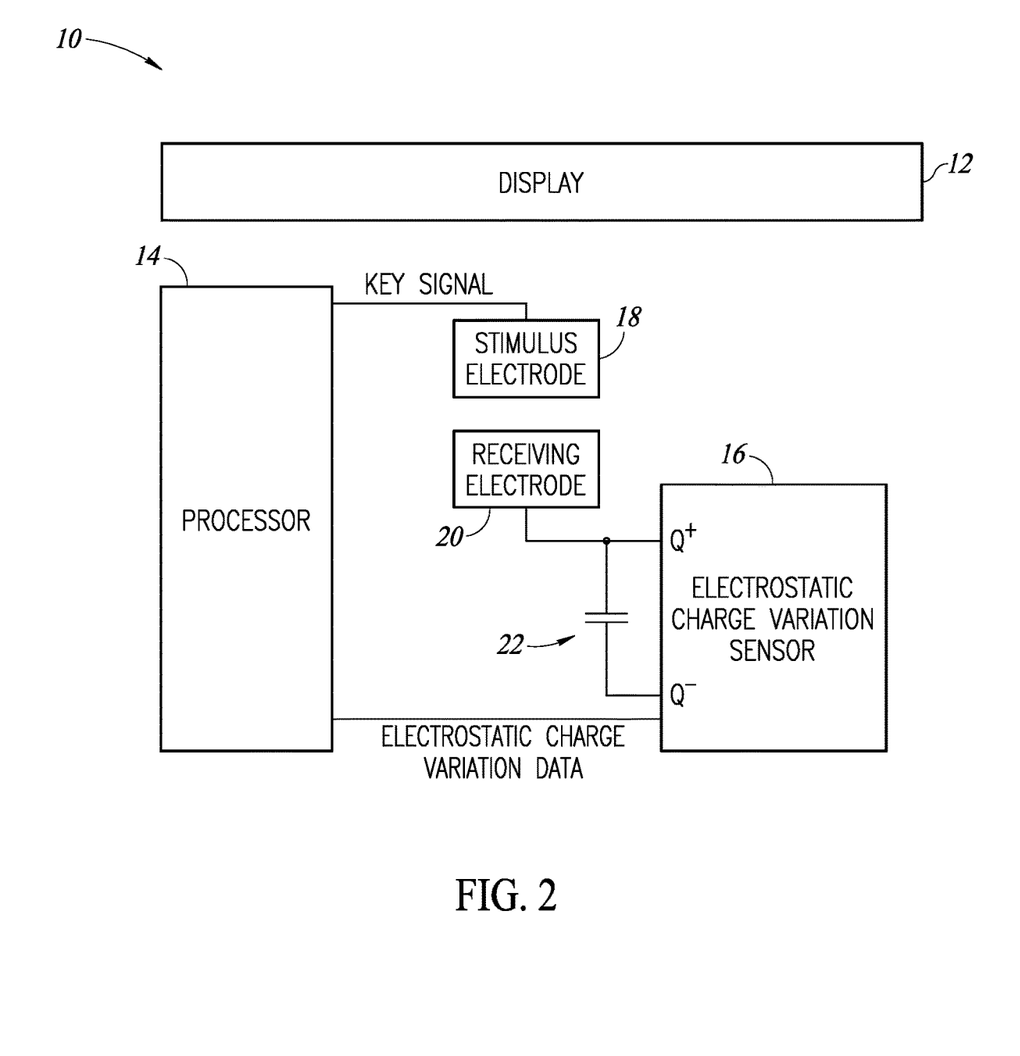
FIG. 2 is a block diagram of a device according to another embodiment disclosed herein.

In the embodiment shown in FIG. 1, the electrostatic charge variation sensor 16 generates and transmits a key signal to the stimulus electrode 18, which in turn transmits the key signal repeatedly. However, the key signal may be generated by other components within the device 10 as well. FIG. 2 is a block diagram of the device 10 according to another embodiment disclosed herein.

Similar to the embodiment shown in FIG. 1, the device 10 in FIG. 2 includes the display 12, the processor 14, the electrostatic charge variation sensor 16, the stimulus electrode 18, and the receiving electrode 20. However, in contrast to the embodiment shown in FIG. 1, the processor 14 generates and transmits the key signal to the stimulus electrode 18 instead of the electrostatic charge variation sensor 16. As such, the processor 14 both generates and transmits the key signal, and decodes and validates the electrostatic charge variation data. In this embodiment, the electrostatic charge variation sensor 16 does not need to be informed of the key used to generate the key signal.

Figure 3A:
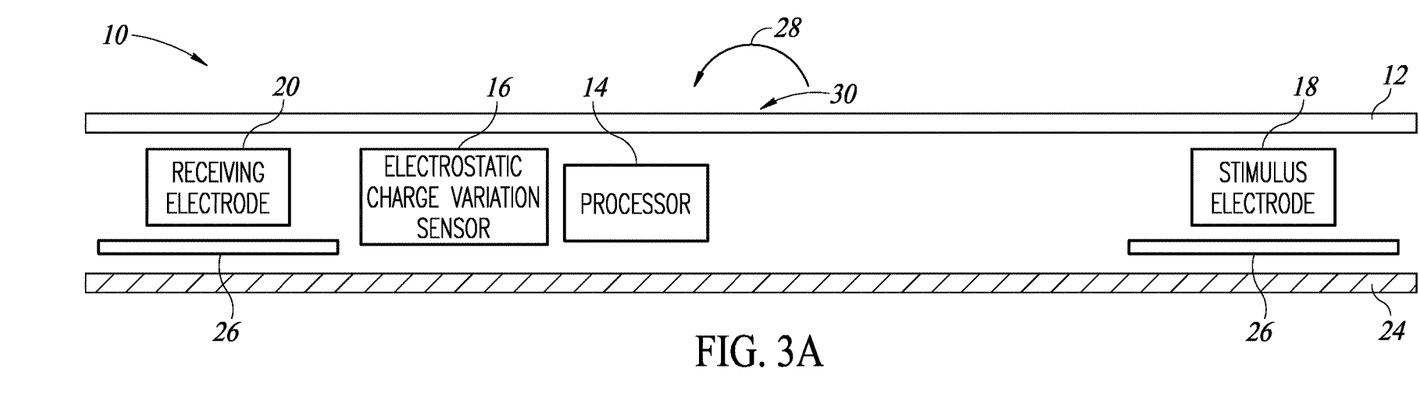
FIG. 3A is a device in an open state according to an embodiment disclosed herein.
Figure 3B:
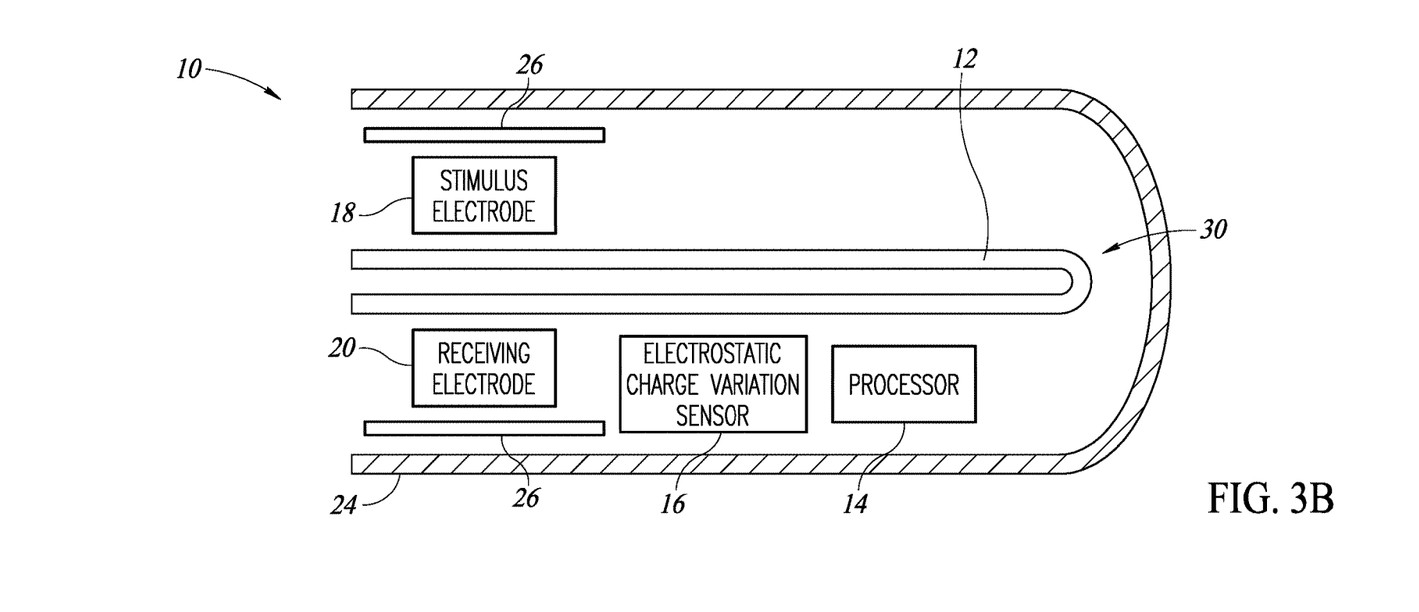
FIG. 3B is the device of FIG. 3A in a closed state according to an embodiment disclosed herein.

FIG. 3A is the device 10 in an open state according to an embodiment disclosed herein. FIG. 3B is the device 10 shown in FIG. 3A in a closed state. FIGS. 3A and 3B show a case where the device 10 is a foldable device. It is beneficial to review FIGS. 3A and 3B together.

As discussed above, the device 10 includes the display 12, the processor 14, the electrostatic charge variation sensor 16, the stimulus electrode 18, and the receiving electrode 20. The processor 14, the electrostatic charge variation sensor 16, the stimulus electrode 18, and the receiving electrode 20 are positioned within a casing or housing 24 of the device 10. The casing 24 encloses internal components of the device 10.

The stimulus electrode 18 is positioned on an opposite side of a portion 30 from the processor 14, the electrostatic charge variation sensor 16, and the receiving electrode 20. Stated differently, the stimulus electrode 18 is positioned at a first end of the display 12, and the processor 14, the electrostatic charge variation sensor 16, and the receiving electrode 20 are positioned at a second end, opposite to the first end, of the display 12. Further, the processor 14, the electrostatic charge variation sensor 16, the stimulus electrode 18, and the receiving electrode 20 directly underlie the display 12. In one embodiment, the processor 14, the electrostatic charge variation sensor 16, the stimulus electrode 18, and the receiving electrode 20 are on a printed circuit board positioned on a surface of the casing 24 that faces the display 12.

The device 10 also includes shields 26. The shields 26 prevent or reduce noise in a surrounding environment from interfering with signals transmitted by the stimulus electrode 18 and signals received by the receiving electrode 20. In one embodiment, each of the shields 26 is grounded. In one embodiment, as shown in FIGS. 3A and 3B, shields 26 are respectively aligned with the stimulus electrode 18 and the receiving electrode 20, and are spaced from the display 12 by the stimulus electrode 18 and the receiving electrode 20.

As shown in FIG. 3A, in an open state, the display 12 is unfolded and is flat. A first end of the display 12 is spaced from a second end, opposite to the first end, of the display 12. The stimulus electrode 18 and the receiving electrode 20 do not face each other. The sides of the stimulus electrode 18 and the receiving electrode 20 that face the display 12 are facing the same direction. In the open state, the receiving electrode 20 is unable to receive and detect the key signal generated by the stimulus electrode 18.

As shown in FIG. 3B, in a closed state, the display 12 is folded on to itself in a direction 28. The first end is closer to the second end in the closed state than the in the open state. The display 12 is bent at the portion 30 of the display 12. The sides of the stimulus electrode 18 and the receiving electrode 20 that face the display 12 are facing each other, and the stimulus electrode 18 and the receiving electrode 20 are directly aligned with each other. Further, the shield 26 behind the stimulus electrode 18 (i.e., directly overlying the stimulus electrode 18 in FIG. 3B) is spaced from the shield 26 behind the receiving electrode 20 (i.e., directly underlying the receiving electrode 20 in FIG. 3B) by the stimulus electrode 18 and the receiving electrode 20. In the closed state, the stimulus electrode 18 and the receiving electrode 20 are in close proximity to each other (e.g., within 1 to 15 millimeters of each other) such that the receiving electrode 20 is able to receive and detect the key signal transmitted by the stimulus electrode 18.

Figure 4A:
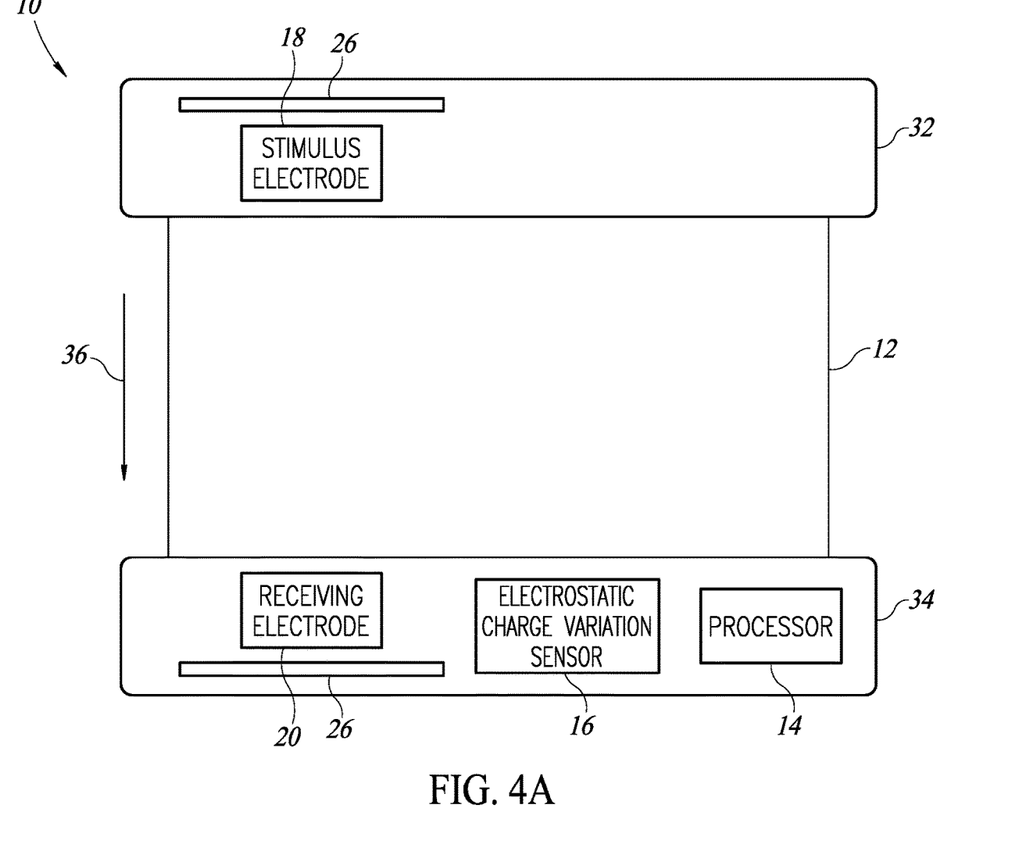
FIG. 4A is a device in an open state according to another embodiment disclosed herein.
Figure 4B:
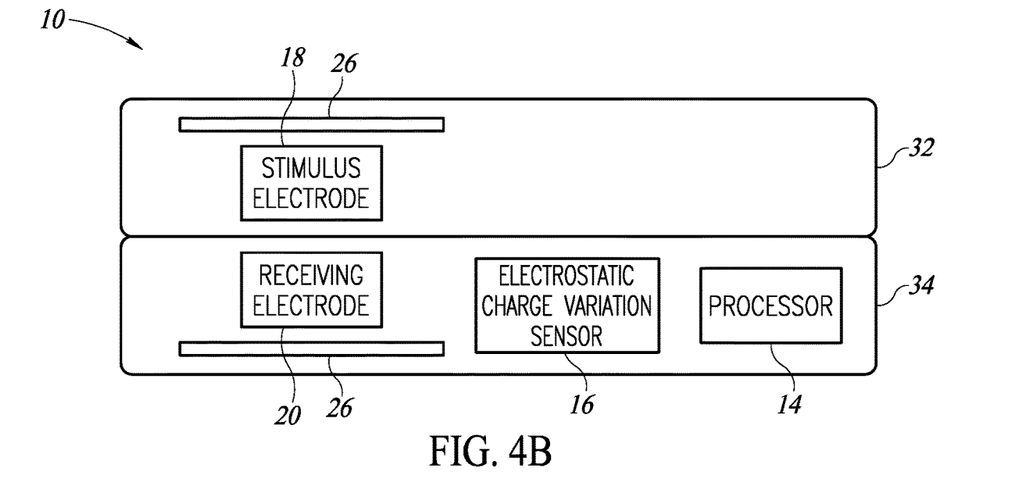
FIG. 4B is the device of FIG. 4A in a closed state according to an embodiment disclosed herein.

FIG. 4A is the device 10 in an open state according to another embodiment disclosed herein. FIG. 4B is the device 10 shown in FIG. 4A in a closed state. FIGS. 4A and 4B show a case where the device 10 is a rollable device. It is beneficial to review FIGS. 4A and 4B together.

Similar to the embodiment shown in FIGS. 3A and 3B, the device 10 in FIGS. 4A and 4B include the display 12, the processor 14, the electrostatic charge variation sensor 16, the stimulus electrode 18, the receiving electrode 20, and shields 26. However, in contrast to the embodiment shown in FIGS. 3A and 3B, the display 12 is a rollable display that is positioned between a first casing 32 and a second casing 34, and couples the first casing 32 and the second casing 34 to each other. The stimulus electrode 18 and a shield 26 are positioned within the first casing 32; and the processor 14, the electrostatic charge variation sensor 16, the receiving electrode 20, and a shield 26 are positioned in the second casing 34. The sides of the stimulus electrode 18 and the receiving electrode 20 that face the display 12 are facing each other.

As shown in FIG. 4A, in an open state, the display 12 is unrolled and is flat. The stimulus electrode 18 and the receiving electrode 20 are spaced from each other by the display 12. The stimulus electrode 18 and the receiving electrode 20 are spaced from each other by a sufficient distance such that the receiving electrode 20 is unable to receive and detect the key signal generated by the stimulus electrode 18.

As shown in FIG. 4B, in a closed state, the display 12 is rolled on to itself in a direction 36. The first casing 32 and the second casing 34 are immediately adjacent to each other (e.g., physically contact each other), and the stimulus electrode 18 and the receiving electrode 20 are directly aligned with each other. Further, the shield 26 adjacent to the stimulus electrode 18 (i.e., within the first casing 32) is spaced from the shield 26 adjacent to the receiving electrode 20 (i.e., within the second casing 34) by the stimulus electrode 18 and the receiving electrode 20. The stimulus electrode 18 and the receiving electrode 20 are in close proximity to each other (e.g., within 1 to 15 millimeters of each other) such that the receiving electrode 20 is able to receive and detect the key signal transmitted by the stimulus electrode 18.

Figure 5:
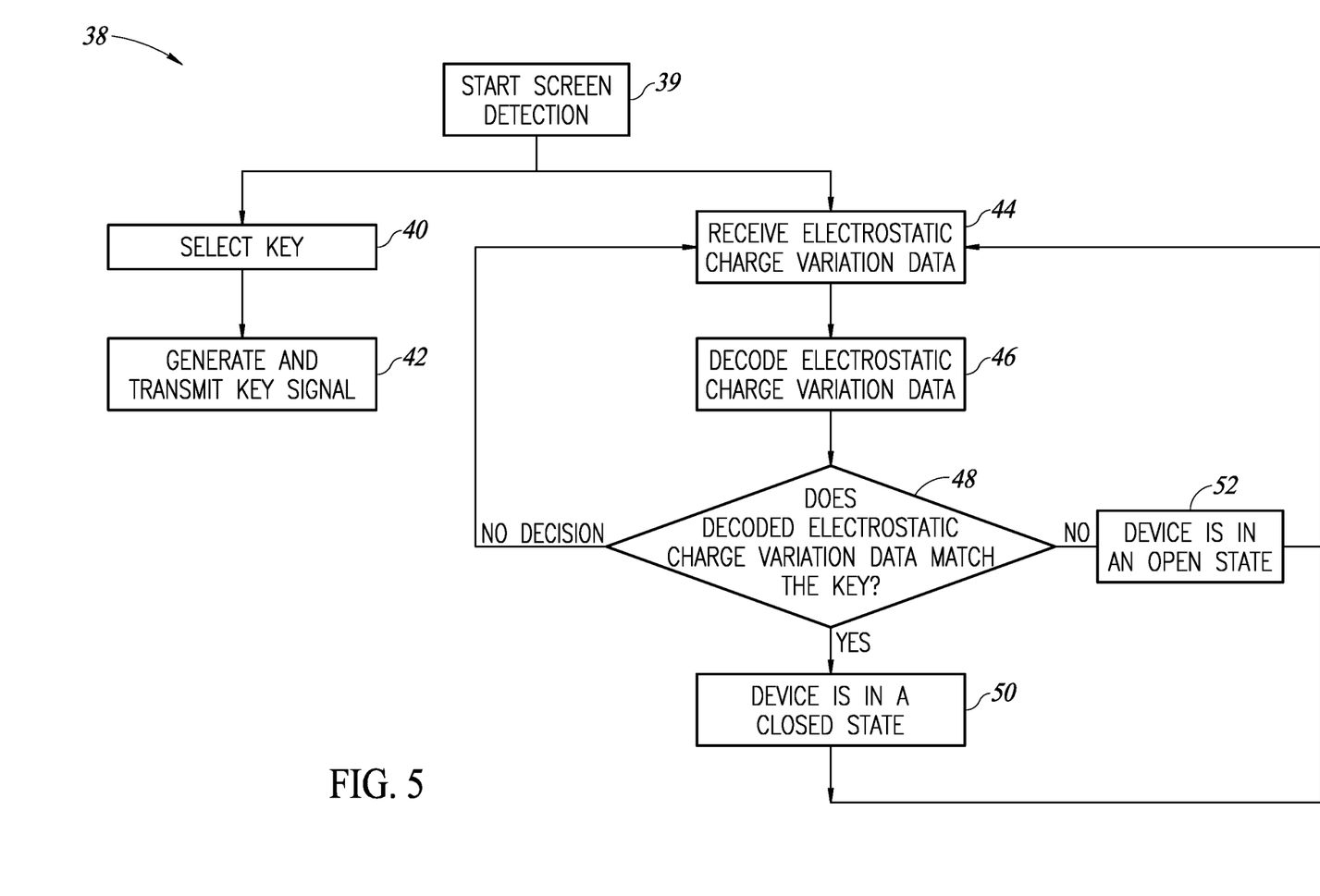
FIG. 5 is a flow diagram of a method for performing screen state detection according to an embodiment disclosed herein.

FIG. 5 is a flow diagram of a method 38 for performing screen state detection according to an embodiment disclosed herein. The method 38 is performed by the device 10.

In block 39, screen detection is initialized. In one embodiment, screen detection is performed periodically at fixed intervals. In one embodiment, screen detection is started in response to movement being detected by motion sensors (e.g., accelerometer, gyroscope, etc.) of the device 10.

In block 40, a key is selected. The key is a data word that includes a plurality of bits. For example, the key may be 10110111. In the embodiment shown in FIG. 1, the key is selected by the electrostatic charge variation sensor 16. In the embodiment shown in FIG. 2, the key is selected by the processor 14.

In block 42, a key signal is generated and transmitted from the stimulus electrode 18. The key signal is a signal that is encoded with the key generated in block 40. In the embodiment shown in FIG. 1, the key signal is generated by the electrostatic charge variation sensor 16. In the embodiment shown in FIG. 2, the key signal is generated by the processor 14.

The key signal is generated by interleaving zeroes into the key. For example, the key of 10110111 is modified to 1000101000101010, and 1000101000101010 is encoded in the key signal. As a result, the key signal has twice as many bits as the key (e.g., an 8 bit key interleaved with zeroes will have 16 bits). Zeroes are interleaved into the key because the electrostatic charge variation sensor 16 measures electrostatic charge variation or change on the receiving electrode 20. As such, in order for 1 bits to be detected properly by the electrostatic charge variation sensor 16, the key signal should switch from a 0 bit to a 1 bit.

Each bit of the key signal is transmitted from the stimulus electrode 18 serially. For example, a bit of the key signal may be transmitted every 15 to 25 milliseconds. Upon transmission of the entire key signal (e.g., all the bits of 1000101000101010), transmission of the key signal is repeated. For example, the key signal may be transmitted every 300 to 400 milliseconds. In one embodiment, stimulus electrode 18 does not transmit the key signal (e.g., idles) between transmissions of the key signal. For example, the stimulus electrode 18 pauses transmission after every transmission of the key signal for 100 to 200 milliseconds.

Blocks 44, 46, 48, 50, 52 are performed concurrently with blocks 40 and 42. In block 44, the processor 14 receives electrostatic charge variation data from the electrostatic charge variation sensor 16. Specifically, the receiving electrode 20 detects and receives electrostatic charges in a surrounding environment, the electrostatic charge variation sensor 16 measures electrostatic charge variations on the receiving electrode 20, and the processor 14 receives measurements of the electrostatic charge variations by the electrostatic charge variation sensor 16 as the electrostatic charge variation data.

In one embodiment, the electrostatic charge variation sensor 16 measures electrostatic charge variation synchronously with transmission of a bit of the key signal by the stimulus electrode 18. For example, the stimulus electrode 18 transmits a bit of the key signal every 20 milliseconds, and the electrostatic charge variation sensor 16 outputs an electrostatic charge variation measurement every 20 milliseconds (i.e., after every transmission of a bit). As noted above, an electrostatic charge variation measurement may not be based on a single data point. Rather, the electrostatic charge variation sensor 16 may have a sampling rate, for example, in the range of 200 hertz to 800 hertz, and determine an electrostatic charge variation measurement based on multiple measurements. Thus, for a bit that is transmitted every 20 milliseconds, the electrostatic charge variation will make, for example, 4 to 16 measurements before outputting an electrostatic charge variation measurement.

In block 46, the processor 14 decodes electrostatic charge variation data received from the electrostatic charge variation sensor 16. The processor 14 decodes electrostatic charge variation data to extract a bit pattern of the electrostatic data. For example, the processor 14 determines a zero bit has been received by the receiving electrode 20 in a case where the electrostatic data indicates the electrostatic charge variation sensor 16 measured an electrostatic charge variation (e.g., measured a voltage level of the electrostatic charge variation) below a threshold value, and determines a 1 bit has been received by the receiving electrode 20 in a case where the electrostatic data indicates the electrostatic charge variation sensor 16 measured an electrostatic charge variation (e.g., measured a voltage level of the electrostatic charge variation) equal to or greater than the threshold value.

In one embodiment, the processor 14 collects electrostatic charge variation data over a period of time, and decodes the electrostatic charge variation data after all of the bits of the key signal have been received. For example, in a case where the key signal has 16 bits, the processor 14 collects 16 bits worth of electrostatic charge variation data, and decodes the data after transmission of the last bit (the $16^{th}$ bit).

In block 48, the processor 14 determines whether the decoded electrostatic charge variation data matches the key used to generate the key signal in block 40. For example, the processor 14 determines whether the decoded electrostatic charge variation data has a bit pattern of 10110111.

As discussed above with respect to FIGS. 3B and 4B, the receiving electrode 20 will receive the key signal transmitted by the stimulus electrode 18 in a closed state. Thus, in a case where the device 10 is in a closed state, the decoded electrostatic charge variation data will match the key in block 48. Accordingly, in a case where the decoded electrostatic charge variation data matches the key in block 48, the method 38 moves to block 50 in which the processor 14 determines the device 10 is in a closed state.

Conversely, as discussed above with respect to FIGS. 3A and 4A, the receiving electrode 20 will not receive the key signal transmitted by the stimulus electrode 18 when the device 10 is in an open state. Thus, in a case where the device 10 is in an open state, the decoded electrostatic charge variation data will not match the key in block 48. Accordingly, in a case where the decoded electrostatic charge variation data does not match the key in block 48, the method 38 moves to block 52 in which the processor 14 determines the device 10 is in an open state.

In some cases, the processor 14 is unable to determine whether the decoded electrostatic charge variation data matches the key in block 48. For example, the electrostatic charge variation data may be unreadable because the electrostatic data is saturated or noisy due to, for example, a person touching the device. In this case, no decision may be made by the processor 14 in block 48, and the method 38 returns to block 44 in which additional electrostatic charge variation data is received by the processor 14. The display status (open state or closed state) of the device 10 does not change.

Upon determining the closed state in block 50 or the open state in block 52, the determined state may be outputted for further processing. For example, a power state of the device 10 may be adjusted based on whether the device 10 is in the closed state or the open state.

Figure 6:
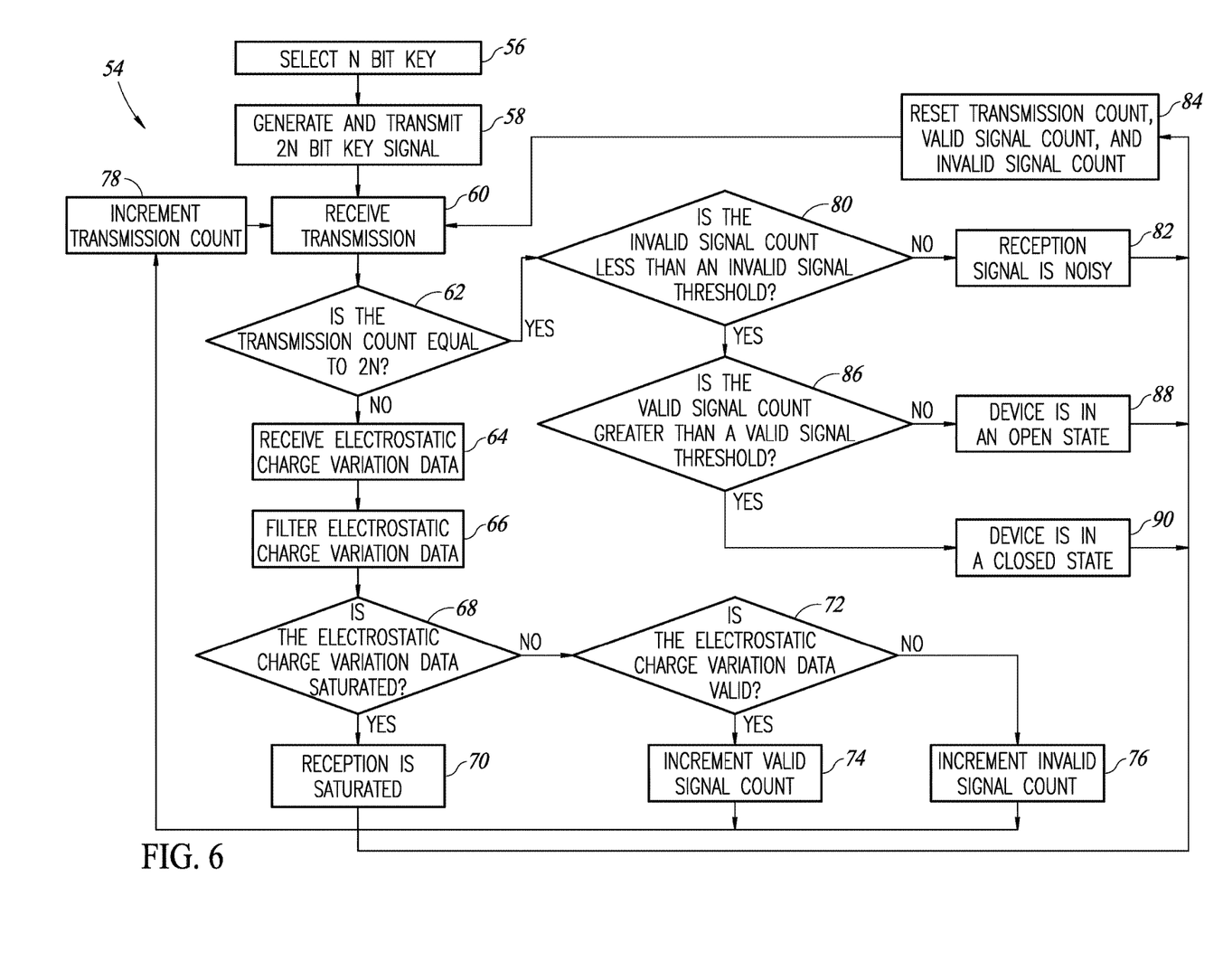
FIG. 6 is a flow diagram of a method for performing screen state detection according to another embodiment disclosed herein.

FIG. 6 is a flow diagram of a method 54 for performing screen state detection according to another embodiment disclosed herein. In contrast to the method 38 shown in FIG. 5, the method 54 determines whether the device 10 is in a closed state or an open state based on a number of valid signals and a number of invalid signals received by the receiving electrode 20.

In block 56, similar to block 40 in FIG. 5, an N bit key is generated. As discussed above, the key is a data word that includes a plurality of bits. For example, the key may be 10110111. In the embodiment shown in FIG. 1, the key is generated by the electrostatic charge variation sensor 16. In the embodiment shown in FIG. 2, the key is generated by the processor 14.

In block 58, similar to block 42 in FIG. 5, a 2N bit key signal is generated and transmitted from the stimulus electrode 18. In the embodiment shown in FIG. 1, the key signal is generated by the electrostatic charge variation sensor 16. In the embodiment shown in FIG. 2, the key signal is generated by the processor 14.

As discussed above, the key signal is generated by interleaving zeroes into the key. For example, the key of 10110111 is modified to 1000101000101010, and 1000101000101010 is encoded in the key signal. As a result, the key signal includes 2N bits, which is twice as many bits as the N bit key generated in block 56.

Further, as discussed above, each bit of the key signal is transmitted from the stimulus electrode 18 serially. For example, a bit of the key signal may be transmitted every 15 to 25 milliseconds. Upon transmission of the entire key signal (e.g., all the bits of 1000101000101010), transmission of the key signal is repeated. For example, the key signal may be transmitted every 300 to 400 milliseconds.

In block 60, the receiving electrode 20 detects and receives electrostatic charge in a surrounding environment, and the electrostatic charge variation sensor 16 measures electrostatic charge variation received on the receiving electrode 20.

In block 62, the processor 14 determines whether a transmission count is equal to 2N, which is the number of bits included in the key signal. The transmission count indicates a total number of potential or candidate bits of the key signal that have been currently transmitted by the stimulus electrode 18. The transmission count is initialized at zero (i.e., the transmission count is zero when the method 54 is started at block 56), and is incremented in block 78, which will be discussed in further detail below.

In a case where the transmission count is not equal to 2N, the method 54 moves to block 64. In block 64, the processor 14 receives electrostatic charge variation data from the electrostatic charge variation sensor 16. The electrostatic charge variation data indicates the measurement of the electrostatic charge variation in block 60. Stated differently, the electrostatic charge variation is a measurement of a potential bit of the key signal.

In block 66, the processor 14 filters the electrostatic charge variation data to remove certain frequencies from the electrostatic charge variation data (e.g., noise, electrostatic charge variation caused by unwanted sources, such as an AC power line, etc.). The processor 14 may apply a low pass filter, a high pass filter, a band pass filter, or a combination thereof to the electrostatic charge variation data.

In block 68, the processor 14 determines whether the electrostatic charge variation data is saturated. If the electrostatic charge variation data is saturated, the electrostatic charge variation on the receiving electrode 20 is outside of a readable range of the electrostatic charge variation sensor 16. Saturation of the electrostatic data may be caused by, for example, a person touching the receiving electrode 20.

In one embodiment, the processor 14 determines the electrostatic charge variation data is saturated in a case where the electrostatic charge variation data indicates the electrostatic charge variation sensor 16 measured an electrostatic charge variation (e.g., measured a voltage level of the electrostatic charge variation) in block 60 that is greater than a threshold value for a determined period of time. In one embodiment, the processor 14 determines the electrostatic charge variation data is unsaturated in a case where the electrostatic charge variation data indicates the electrostatic charge variation sensor 16 measured an electrostatic charge variation (e.g., measured a voltage level of the electrostatic charge variation) in block 60 that is not greater than the threshold value for the determined period of time.

In a case where the electrostatic charge variation data is saturated, the method 54 moves to block 70. In block 70, the processor 14 determines that reception by the receiving electrode 20 is saturated. Consequently, the display status (open state or closed state) of the device 10 does not change. The method 54 then moves to block 84.

In block 84, the transmission count is reset to zero, along with a valid signal count and an invalid signal count. The valid signal count and the invalid signal count will be discussed in further detail below with respect to blocks 74 and 76, respectively. By resetting the transmission count, the valid signal count, and the invalid signal count to zero, the processor 14 restarts checking reception of the key signal at a first, initial bit. The method 54 then returns to block 60 where the receiving electrode 20 detects and receives another electrostatic charge variation in a surrounding environment, and the electrostatic charge variation sensor 16 measures the electrostatic charge variation on the receiving electrode 20.

Returning to block 68, in a case where the electrostatic charge variation data is unsaturated, the method 54 moves to block 72. In block 72, the processor 14 determines whether the electrostatic charge variation data is valid or invalid.

In one embodiment, the processor 14 determines the electrostatic charge variation data is valid in a case where the electrostatic charge variation data indicates the (1) the electrostatic charge variation sensor 16 measured an electrostatic charge variation (e.g., measured a voltage level of the electrostatic charge) in block 60 that is greater than a threshold value, and (2) the receiving electrode 20 received the electrostatic charge variation in block 60 in a determined time slot (e.g., a time slot in which the stimulus electrode 18 transmits a bit of the key signal).

In one embodiment, the processor 14 determines the electrostatic charge variation data is invalid in a case where the electrostatic charge variation data indicates the (1) the electrostatic charge variation sensor 16 measured an electrostatic charge variation (e.g., measured a voltage level of the electrostatic charge variation in block 58) in block 60 that is not greater than the threshold value, or (2) the receiving electrode 20 received the electrostatic charge variation in block 60 outside of the determined time slot.

In one embodiment, the threshold value in block 72 is less than the threshold value used in block 68.

In a case where the electrostatic charge variation data is valid, the method 54 moves to block 74. In block 74, a valid signal count is incremented. The valid signal count indicates a total number of valid electrostatic data that has been generated by the electrostatic charge variation sensor 16. The valid signal count is initialized at zero (i.e., the valid signal count is zero when the method 54 is started at block 56). The method 54 then moves to block 78.

In block 78, the transmission count, which was discussed with respect to block 62, is incremented. The method 54 then moves back to block 60 to detect and receive another electrostatic charge variation in the surrounding environment.

Returning to block 72, in a case where the electrostatic charge variation data is invalid, the method 54 moves to block 76. In block 76, an invalid signal count is incremented. The invalid signal count indicates a total number of invalid electrostatic data that has been generated by the electrostatic charge variation sensor 16. The invalid signal count is initialized at zero (i.e., the invalid signal count is zero when the method 54 is started at block 56). The method 54 then moves to block 78.

As discussed above, in block 78, the transmission count is incremented. The method 54 then moves back to block 60 to detect and receive another electrostatic charge variation in the surrounding environment.

Returning to block 62, in a case where the transmission count is equal to 2N, the method moves to block 80. When the transmission count is 2N the receiving electrode 20 has possibly received all of the 2N bits of the key signal. In block 80, the processor 14 determines whether the invalid signal count is less than an invalid signal threshold.

In a case where the invalid signal count is not less than the invalid signal threshold, the method 54 moves to block 82. In block 82, the processor 14 determines the reception signal received by the receiving electrode 20 is too noisy. Consequently, the display status (open state or closed state) of the device 10 does not change. The method 54 then moves to block 84.

As discussed above, in block 84, the transmission count, the valid signal count, and the invalid signal count are reset to zero. By resetting the transmission count, the valid signal count, and the invalid signal count to zero, the processor 14 restarts checking reception of the key signal at a first, initial bit. The method 54 then moves back to block 60 to detect and receive another electrostatic charge variation in the surrounding environment.

Returning to block 80, in a case where the invalid signal count is less than the invalid signal threshold, the method 54 moves to block 86. In block 86, the processor 14 determines whether the valid signal count is greater than a valid signal threshold.

In a case where the valid signal count is not greater than the valid signal threshold, the method 54 moves to block 88. In block 88, the processor 14 determines the device 10 is in an open state as discussed above. The method 54 then moves to block 84, where the transmission count, the valid signal count, and the invalid signal count are reset to zero.

Returning to block 86, in a case where the valid signal count is greater than the valid signal threshold, the method 54 moves to block 90. In block 90, the processor 14 determines the device 10 is in a closed state as discussed above. The method 54 then moves to block 84, where the transmission count, the valid signal count, and the invalid signal count are reset to zero.

Figure 7A:
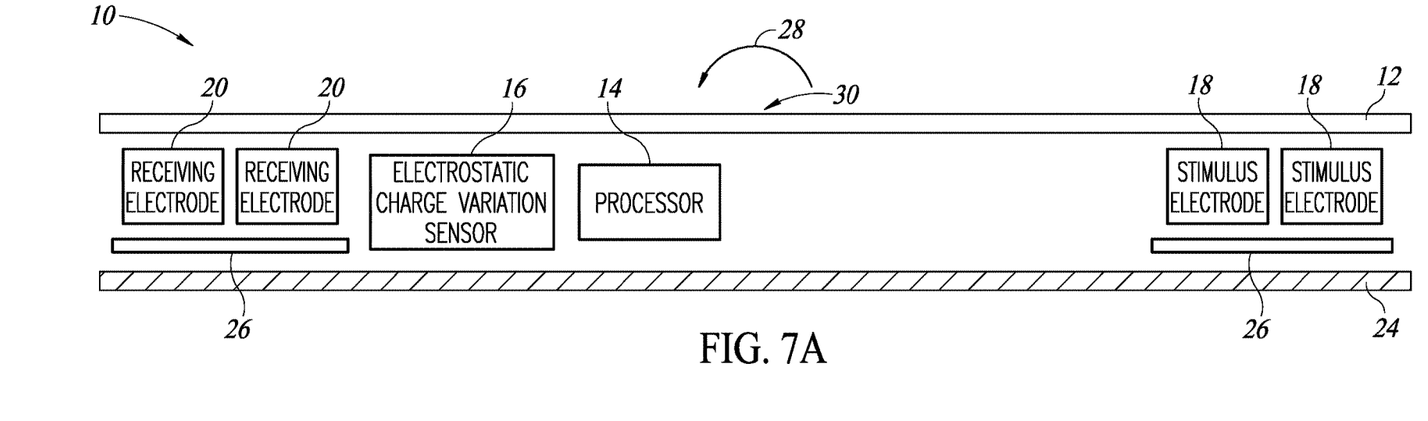
FIG. 7A is a device in an open state according to another embodiment disclosed herein.
Figure 7B:
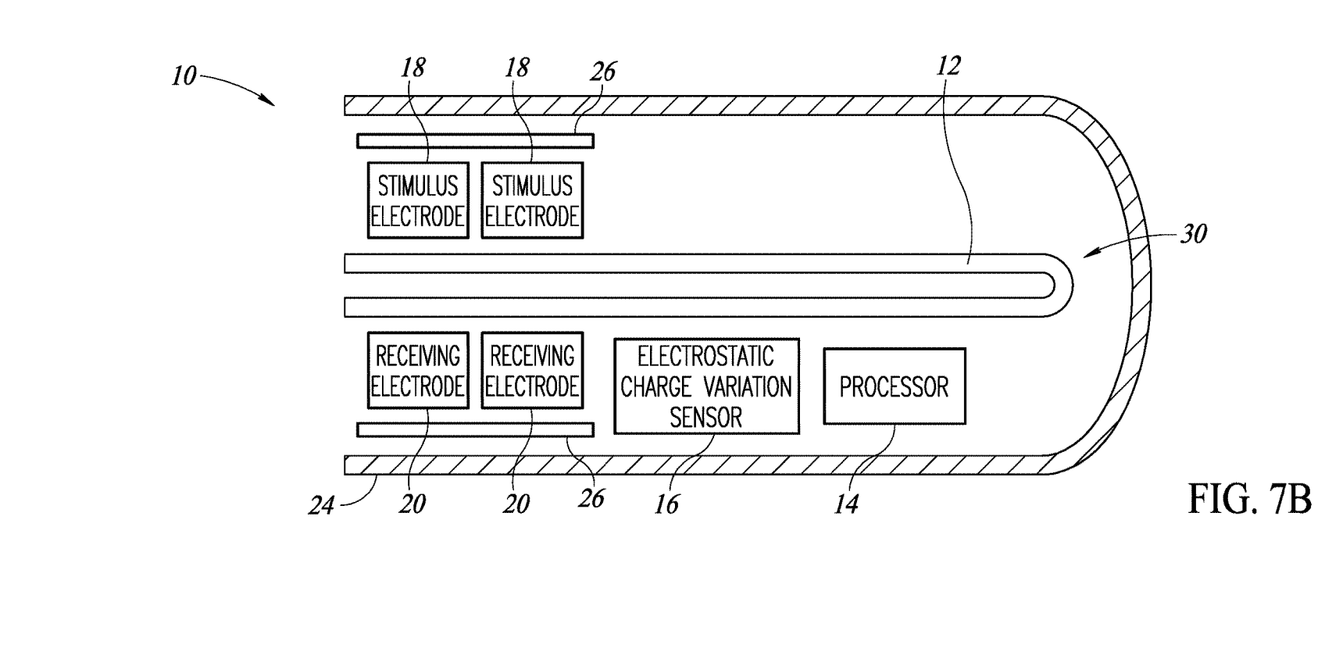
FIG. 7B is the device of FIG. 7A in a closed state according to an embodiment disclosed herein.

In the embodiment discussed above, the device 10 includes a stimulus electrode 18 and a corresponding receiving electrode 20. However, the device 10 may include any number of stimulus and receiving electrodes. For example, FIG. 7A is the device 10 in an open state according to another embodiment disclosed herein. FIG. 7B is the device 10 shown in FIG. 7A in a closed state. The embodiment shown in FIGS. 7A and 7B is the same as the embodiment shown in FIGS. 3A and 3B, except that the device 10 includes two stimulus electrodes 18 adjacent to each other, and two receiving electrodes 20 adjacent to each other. In the closed state, each of the stimulus electrodes 18 are aligned with a respective receiving electrode 20. The stimulus electrodes 18 concurrently transmit key signals, and the receiving electrodes 20 concurrently receive electrostatic charge.

Including two stimulus electrodes 18 and two receiving electrodes 20 as shown in FIGS. 7A and 7B allows a differential configuration for both reception and transmission. In this embodiment, a first key signal (e.g., 10100011) is transmitted from a first stimulus electrode (e.g., leftmost stimulus electrode in FIG. 7B), and a second key signal that is complementary to the first key signal (e.g., 01011100) is transmitted from a second stimulus electrode (e.g., rightmost stimulus electrode in FIG. 7B). In the closed state as shown in FIG. 7B, a first receiving electrode (e.g., leftmost receiving electrode in FIG. 7B) receives the first key signal from the first stimulus electrode, and a second receiving electrode (e.g., rightmost stimulus electrode in FIG. 7B) receives the second key signal from the second stimulus electrode. The first receiving electrode is electrically coupled to the first input $Q^+$ (the positive terminal) of the electrostatic charge variation sensor 16, and the second receiving electrode 12B is electrically coupled to the second input $Q^-$ (the negative terminal) of the electrostatic charge variation sensor 16. As such, the electrostatic charge variation sensor 16 measures electrostatic charge variation as a differential between signals received by the first input $Q^+$ and the second input $Q^-$.

As the electrostatic charge variation sensor 16 measures the difference between the first input $Q^+$ and the second input $Q^-$, noise, which is common to both inputs, will be canceled or at least strongly attenuated. Further, as the first and key signals are complementary and opposite in phase at the first input $Q^+$ and the second input $Q^-$, the data signal will be doubled. As a result, the signal to noise ratio of the device 10 is greatly improved.

The various embodiments disclosed herein provide devices and methods for performing screen state detection. The screen state detection may be used in conjunction with any device having a bendable display. The device and method utilizes an electrostatic charge variation sensor to detect whether the display is in an open state or a closed state.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a bendable display;
   a first stimulus electrode configured to transmit a first key signal;
   a first receiving electrode configured to receive an electrostatic charge variation in a surrounding environment;
   an electrostatic charge variation sensor configured to measure the electrostatic charge variation, and generate electrostatic charge variation data based on the measured electrostatic charge variation; and
   a processor configured to determine whether the bendable display is in an open state or a closed state based on the electrostatic charge variation data and the first key signal.

2. The device of claim 1 wherein the processor is configured to generate the first key signal, and provide the first key signal to the first stimulus electrode for transmission.

3. The device of claim 1 wherein the electrostatic charge variation sensor is configured to generate the first key signal, and provide the first key signal to the first stimulus electrode for transmission.

4. The device of claim 1 wherein the bendable display includes a first end and a second end opposite to the first end, the first end is spaced from the second end in the open state, and the first end is closer to the second end in the closed state than in the open state.

5. The device of claim 1 wherein the bendable display is a foldable display that is in an unfolded state in the open state and in a folded state in the closed state.

6. The device of claim 1 wherein the bendable display is a rollable display that is in an unrolled state in the open state and in a rolled state in the closed state.

7. The device of claim 1, further comprising:
   a first shield, the first stimulus electrode being positioned between the bendable display and the first shield; and
   a second shield, the first receiving electrode being positioned between the bendable display and the second shield.

8. The device of claim 1 wherein the processor is configured to determine the bendable display is in the open state in a case where the electrostatic charge variation data does not match a key included in the first key signal, and determine the bendable display is in the closed state in a case where the electrostatic charge variation data matches a key included in the first key signal.

9. The device of claim 1 wherein
the processor is configured to determine a number of times valid electrostatic charge variation data has been generated by the electrostatic charge variation sensor, and
the processor is configured to determine the bendable display is in the open state in a case where the number of times is greater than a threshold value, and determines the bendable display is in the closed state in a case where the number of times is not greater than the threshold value.

10. The device of claim 1 wherein
the processor is configured to determine a number of times invalid electrostatic charge variation data has been generated by the electrostatic charge variation sensor, and
the processor is configured to determine the electrostatic charge variation is noise in a case where the number of times is not less than a threshold value.

11. The device of claim 1 wherein first key signal is a key with zeroes inserted between key bits.

12. The device of claim 1, further comprising:
a second stimulus electrode positioned adjacent to the first stimulus electrode and configured to transmit a second key signal that is complementary to the first key signal; and
a second receiving electrode positioned adjacent to the first receiving electrode and configured to receive the electrostatic charge variation.

13. A method, comprising:
generating a key signal based on a key;
transmitting, by a stimulus electrode, the key signal;
receiving, by a receiving electrode, an electrostatic charge variation in a surrounding environment;
measuring, by an electrostatic charge variation sensor, the electrostatic charge variation;
generating, by the electrostatic charge variation sensor, electrostatic charge variation data based on the measured electrostatic charge variation; and
determining, by a processor, whether a bendable display is in an open state or a closed state based on the electrostatic charge variation data and the key signal.

14. The method of claim 13 wherein the generating of the key signal is performed by the electrostatic charge variation sensor.

15. The method of claim 13 wherein the generating of the key signal is performed by the processor.

16. The method of claim 13 wherein the generating of the key includes inserting zeroes between bits of the key.

17. A method, comprising:
transmitting, by a stimulus electrode, a key signal;
receiving, by a receiving electrode, an electrostatic charge variation in a surrounding environment;
measuring, by an electrostatic charge variation sensor, the electrostatic charge variation;
generating, by the electrostatic charge variation sensor, electrostatic charge variation data based on the measured electrostatic charge variation;
determining, by a processor, a first number indicating a number of times valid electrostatic charge variation data has been generated by the electrostatic charge variation sensor;
determining, by the processor, a second number indicating a number of times invalid electrostatic charge variation data has been generated by the electrostatic charge variation sensor; and
determining, by the processor, whether a bendable display is in an open state or a closed state based on the first number and the second number.

18. The method of claim 17, further comprising:
filtering, by the processor, the electrostatic charge variation data to remove signals within a range of frequencies.

19. The method of claim 17, further comprising:
determining, by the processor, whether or not the electrostatic charge variation data is saturated, the determining of the first number and the second number being performed in a case where the processor determines the electrostatic charge variation data is unsaturated.

20. The method of claim 17 wherein
the processor determines the electrostatic charge variation data is valid in a case where electrostatic charge variation data indicates (1) a voltage level of the measured electrostatic charge variation is greater than a threshold value, and (2) the receiving electrode received the electrostatic charge variation in a determined time slot, and
the processor determines the electrostatic charge variation data is invalid in a case where electrostatic charge variation data indicates (1) the voltage level of the measured electrostatic charge variation is not greater than the threshold value, or (2) the receiving electrode did not receive the electrostatic charge variation in the determined time slot.

* * * * *